United States Patent
Goor et al.

(10) Patent No.: US 10,561,255 B2
(45) Date of Patent: Feb. 18, 2020

(54) BABY SEAT

(71) Applicant: MOBIUS PROTECTION SYSTEMS LTD., Modiin (IL)

(72) Inventors: Oren Goor, Savyon (IL); Anan Hasan, Julis (IL); Shy Mindel, Hod Hasharon (IL)

(73) Assignee: Mobius Protection Systems Ltd., Modiin (IL)

( * ) Notice: Subject to any disclaimer, the term of this patent is extended or adjusted under 35 U.S.C. 154(b) by 0 days.

(21) Appl. No.: 15/776,556

(22) PCT Filed: Nov. 16, 2016

(86) PCT No.: PCT/IL2016/051233
§ 371 (c)(1),
(2) Date: May 16, 2018

(87) PCT Pub. No.: WO2017/085719
PCT Pub. Date: May 26, 2017

(65) Prior Publication Data
US 2018/0325282 A1 Nov. 15, 2018

Related U.S. Application Data

(60) Provisional application No. 62/255,885, filed on Nov. 16, 2015.

(51) Int. Cl.
*B60N 2/26* (2006.01)
*B60N 2/28* (2006.01)
(Continued)

(52) U.S. Cl.
CPC .......... *A47D 13/025* (2013.01); *B60N 2/286* (2013.01); *B60N 2/2845* (2013.01);
(Continued)

(58) Field of Classification Search
CPC .... B60N 2/2821; B60N 2/2845; B60N 2/286; B60N 2/2863; B60N 2/2872; B60N 2/2881
(Continued)

(56) References Cited

U.S. PATENT DOCUMENTS 5,207,476 A    5/1993   Payne
5,267,680 A *  12/1993  Torok ............... A47D 13/02
                                              297/183.1 X
(Continued)

FOREIGN PATENT DOCUMENTS

DE      10001155 A1 *   7/2001  .......... B60N 2/2845
DE   10 2012 017590       4/2014
EP       1251028 A1 *  10/2002  ............. A47D 13/02

OTHER PUBLICATIONS

International Search Report dated Mar. 24, 2017 for corresponding application PCT/IL2016/051233.
(Continued)

*Primary Examiner* — Rodney B White
(74) *Attorney, Agent, or Firm* — Pearl Cohen Zedek Latzer Baratz LLP (57) ABSTRACT

A portable baby seat (10) has a longitudinally oriented carrying handle (100) that is coupled to the baby seat shell (300) in parallel with the baby seat longitudinal axis x, coupled to the back of the seat as well as the bottom of the structure thus assisting in reducing loads exerted on the portable baby seat.

20 Claims, 5 Drawing Sheets

(51) Int. Cl.
*A47D 1/10* (2006.01)
*A47D 13/02* (2006.01)

(52) U.S. Cl.
CPC ......... *B60N 2/2863* (2013.01); *B60N 2/2872* (2013.01); *B60N 2/2881* (2013.01)

(58) Field of Classification Search
USPC .................. 297/183.1, 183.2, 183.3, 183.4
See application file for complete search history.

(56) References Cited

U.S. PATENT DOCUMENTS

| | | | | |
|---|---|---|---|---|
| 5,322,343 | A * | 6/1994 | Parker | A47D 13/02 297/183.3 X |
| 5,516,190 | A * | 5/1996 | Kain | A47D 13/02 297/183.3 |
| 5,544,935 | A * | 8/1996 | Cone, II | A47D 13/02 297/183.2 X |
| 5,651,581 | A * | 7/1997 | Myers | A47D 13/02 297/183.1 X |
| 5,961,180 | A * | 10/1999 | Greger | A47D 13/025 297/183.2 |
| 5,971,476 | A * | 10/1999 | Gibson | A47D 13/02 297/183.4 |
| 6,367,875 | B1 * | 4/2002 | Bapst | A47D 13/02 297/183.1 X |
| 6,971,655 | B1 * | 12/2005 | Harris | B60N 2/2806 297/250.1 X |
| 7,597,396 | B2 * | 10/2009 | Longenecker | B60N 2/2806 297/256.16 X |
| 8,182,033 | B2 | 5/2012 | Hei et al. | |
| 8,870,282 | B2 * | 10/2014 | Tew | B60N 2/2845 297/183.3 X |
| 2006/0208541 | A1 * | 9/2006 | Sanchez | A47D 13/02 297/183.1 |
| 2006/0249997 | A1 * | 11/2006 | Sanchez | A47D 13/02 297/183.1 |
| 2008/0018145 | A1 * | 1/2008 | Tuckey | A47D 13/105 297/183.3 |
| 2010/0051658 | A1 | 3/2010 | Parness | |
| 2011/0089726 | A1 * | 4/2011 | Gibree | B60N 2/2806 297/183.1 |
| 2012/0056452 | A1 * | 3/2012 | Longenecker | B60N 2/2806 297/183.1 |
| 2012/0205947 | A1 | 8/2012 | Coote et al. | |
| 2012/0326474 | A1 * | 12/2012 | Williams | B60N 2/2821 297/183.1 |
| 2013/0001939 | A1 | 1/2013 | Celia | |
| 2014/0008952 | A1 * | 1/2014 | Spence | B60N 2/265 297/256.1 |
| 2016/0347211 | A1 * | 12/2016 | Dobson | B60N 2/2881 |
| 2017/0080829 | A1 * | 3/2017 | Kunkel | B60N 2/2848 |
| 2018/0050614 | A1 * | 2/2018 | Gay | B60N 2/2845 |
| 2018/0079332 | A1 * | 3/2018 | Williams | B60N 2/2824 |

OTHER PUBLICATIONS

Search Report dated Jun. 24, 2019 for corresponding European Application No. 16865880.5.

* cited by examiner

BABY SEAT

CROSS-REFERENCE TO RELATED APPLICATIONS

This application is a National Phase Application of PCT International Application No. PCT/IL2016/051233, International Filing Date Nov. 16, 2016, claiming priority of U.S. Patent Application No. 62/255,885, filed Nov. 16, 2015, which is hereby incorporated by reference.

BACKGROUND OF THE INVENTION

The disclosure is directed to a baby seat.

Safety regulations in most countries require babies and young children to be seated in a special car seat. In general, there is a first type of car seat for infants up to the age of 12-15 months, a second type for babies up to the age of 3-4 years, and a third type of seat for young children in the age of 4-8 years.

There are several problems associated with the baby seats of the prior art. For example, the comfort of the parent while positioning (e.g., loading or unloading) the baby while in his seat—in the car and positioning the seat into a trolley.

Generally, it is very uncomfortable for the parent to put the baby while at his seat in the car, either facing the front of the car (babies in the age of 1-4 years old) or the rear of the car (infants up to 12-15 months old). Moreover, there is a need for a strong seat that minimizes the seat deflection during a crash event.

SUMMARY OF THE INVENTION

In an embodiment, there is provided a portable baby seat comprising: a seat shell having a longitudinal axis configured to accommodate and receive a padded insert, the seat shell having a shallow anterior end and a raised posterior end, and an arcuate floor rising from the shallow anterior end toward the raised posterior end; and an arcuate handle, having a proximal end and a distal end and a longitudinal axis parallel to the longitudinal axis of the seat shell, the proximal end of the arcuate handle configured to be positioned above the portable baby seat's center of gravity when carrying the portable baby seat or the portable baby seat and the baby.

BRIEF DESCRIPTION OF THE DRAWINGS

The features of the baby seat having a carrying handle coupled to the baby seat in parallel with the baby seat longitudinal axis described herein will become apparent from the following detailed description when read in conjunction with the drawings, which are exemplary, not limiting, and wherein like elements are numbered alike in several figures and in which.

While the disclosure is amenable to various modifications and alternative forms, specifics thereof have been shown by way of example in the drawings and will be further described in detail herein below. It should be understood, however, that the intention is not to limit the disclosure to the particular embodiments described. On the contrary, the intention is to cover all modifications, equivalents, and alternatives.

DETAILED DESCRIPTION

The disclosure relates in one embodiment to baby seats having a carrying handle coupled to the baby seat in parallel with the baby seat longitudinal axis, which unlike standard handle, having a handle that is coupled to the back of the seat as well as the bottom of the structure.

This design can be beneficial for example, since being a part of the structure it can support any forward or backward loads expected during a crash event; instead of having a handle in which the weight is merely an additional mass of the seat, the handle itself can now support the structure and enable reduction of weight from the seat, thus contributing to the ease of use.

According to some embodiments of the invention, provided herein is a portable baby seat comprising: a seat shell having a longitudinal axis configured to accommodate and receive a padded insert, the seat shell having a shallow anterior end and a raised posterior end, and an arcuate floor rising from the shallow anterior end toward the raised posterior end; and an arcuate handle, having a proximal end and a distal end and a longitudinal axis parallel to the longitudinal axis of the seat shell, the proximal end of the arcuate handle configured to be positioned above the portable baby seat's center of gravity when carrying the portable baby seat or the portable baby seat and the baby.

In an embodiment, the term "proximal" provides an initial reference point and the term "distal" means more distant from the initial reference point along a generally vertical axis. The term "anterior" means toward the front part or the face and the term "posterior" means toward the back of the member.

According to some embodiments of the invention, in the extended carrying position, the proximal end of the arcuate handle used in the baby seat having a carrying handle coupled to the baby seat in parallel with the baby seat longitudinal axis described herein, can be configured to slidably transition (in other words, used in its broadest sense to refer to elements which permits one element to slide or translate with respect to another element), between an extended carrying position and a stowed retracted position. (See e.g., FIGS. 1A, 1B)

Figure 1A:
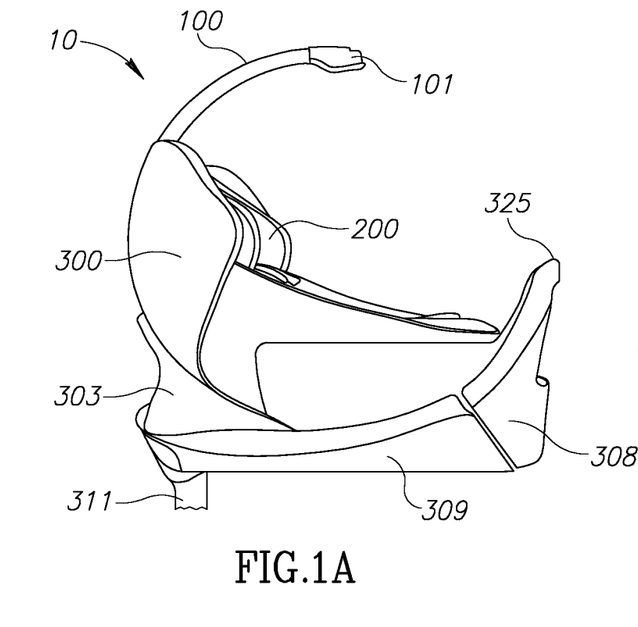
FIG. 1A shows an assembled baby seat with the handle in its extended position, according to some embodiments of the invention.
Figure 1B:
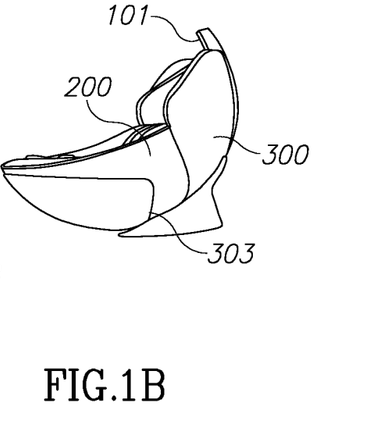
FIG. 1B shows the baby seat of FIG. 1A from the other side with the handle in the retracted position.

In some embodiments, the seat shell can further comprise a seat shell stabilizing member, configured to couple at one end to the shallow anterior end of the seat shell (or be a monolithic part thereof), along the longitudinal axis of the seat shell and accommodate the portion of the padded insert extending beyond the shallow anterior end of the seat shell (See e.g., FIG. 1B). Furthermore, the seat shell stabilizing member can further comprise an additional handle extending apically from the end of the seat shell stabilizing member opposite the one end of the seat shell stabilizing member coupled to the seat shell and be positioned transverse to the carrying handle.

The seat shell may be formed of a composite material to provide the seat shell with the ability to absorb energy and deflect energy in crash circumstances. The composite material constituting the seat shell and/or the arcuate handle can contain a thermoplastic resin and a carbon fiber. The weight ratio of the carbon fiber/thermoplastic resin in the composite material can be, for example, between 20/80 and 80/20. For example, the ratio can be between 30/70 to 70/30. The carbon fiber composite material can be unidirectional and/or random carbon fiber composite material and have an average fiber diameter of 3 to 12 μm. The carbon fiber can be embedded in a thermoplastic or thermoset resin, for example epoxy, or other resin materials, like an aliphatic polyamide, a polyolefin, a polyacrylate, polysiloxanes, a polycarbonate, their mixture, copolymers, derivatives of interpenetrating networks.

The baby seat described herein, can be configured to be facing backwards or forward.

Moreover, according to some embodiments of the invention, the seat shell used in the baby seat having a carrying handle coupled to the baby seat in parallel with the baby seat longitudinal axis described herein, can further comprise engagement means, configured to slidably engage the arcuate handle. These engagement means can, for example, be rings embedded in the seat shell floor creating an annulus for passage of the carrier handle or a portion thereof. Other engagement means can be an arcuate duct, configured to receive and engagedly couple the handle or a portion thereof, embedded within the seat shell floor channel. Other engagement elements configured to engagedly couple the carrier handle or a portion thereof are likewise considered. In an embodiment, the term "engaging element" refers to one or a plurality of coupled components, at least one of which is configured for slidably engaging a carrier handle or a portion thereof. Thus, this term encompasses both single part engaging elements and multi-part-assemblies.

According to some embodiments of the invention, the carrying handle or portion thereof used in the baby seat having a carrying handle coupled to the baby seat in parallel with the baby seat longitudinal axis described herein, can be a part of the arcuate carrying handle, whereby the radius defined by the arcuate handle and or the longitudinal channel defined in the (complementary) arcuate seat shell floor can be between about 15 cm and about 70 cm. Likewise, the radius of the longitudinal channel defined in the seat shell floor may be larger than the radius of the arcuate handle by between about 0.1 cm and about 5 cm.

Figure 3A:
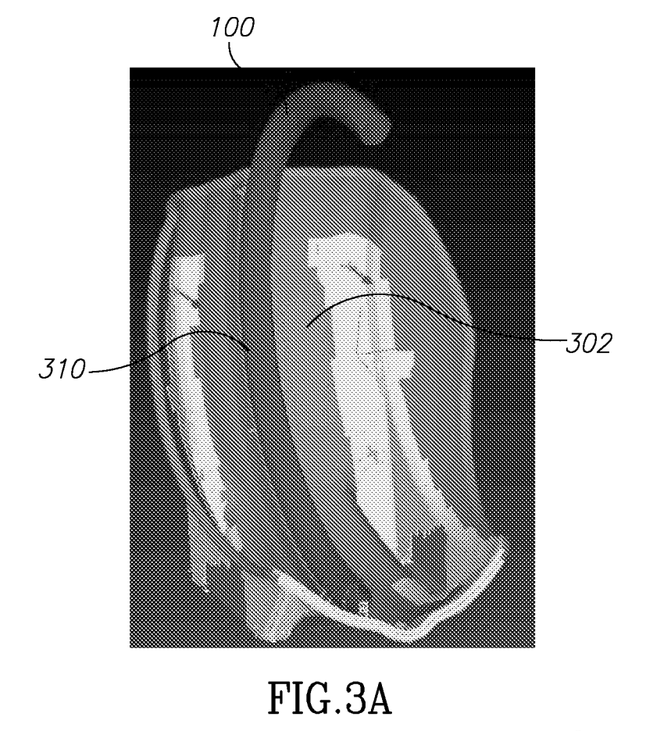
FIG. 3A, shows finite element analysis FEA of an unloaded seat according to some embodiments of the invention, with the same seat FEA in a loaded configuration in FIG. 3B.
Figure 3B:
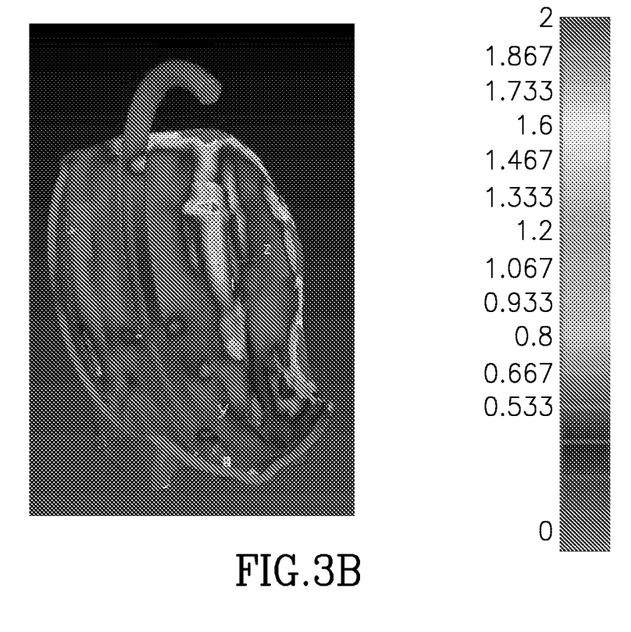

In an embodiment, holding the portable baby seat by the arcuate handle's proximal end can be configured to reduce the load the seat shell floor experiences when lifted and carried (see e.g., FIG. 3B).

Moreover, the arcuate handle used in the baby seat having a carrying handle coupled to the baby seat in parallel with the baby seat longitudinal axis described herein, can be telescopic and may have a proximal sliding member telescopically nested within a distal sleeve member which may be operably coupled to the arcuate seat shell floor. The sliding member can likewise be configured to extend from a stowed (nested) retracted position to an extended carrying position, for example such that when in the extended position, the proximal end of the arcuate handle can be configured to be positioned above (for example, be vertically aligned with) the portable baby seat's center of gravity when carrying the portable baby seat and/or the portable baby seat and the baby. Since the width of the seat (and the baby) is narrower, the leverage exerted by motion of the seat or the baby may be reduced.

Detailed embodiments of the present technology are disclosed herein; however, it is to be understood that the disclosed embodiments are merely exemplary, which can be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The terms "first," "second," and the like, herein do not denote any order, quantity, or importance, but rather are used to denote one element from another. The terms "a", "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the mean(s) includes one or more mean). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In addition, for the purposes of the present disclosure, directional or positional terms such as "top", "bottom", "upper," "lower," "side," "front," "frontal," "forward," "rear," "rearward," "back," "trailing," "above," "below," "left," "right," "horizontal," "vertical," "upward," "downward," "outer," "inner," "exterior," "interior," "intermediate," etc., are merely used for convenience in describing the various embodiments of the present disclosure.

The term "coupled", including its various forms such as "operably coupled", "coupling" or "coupleable", refers to and comprises any direct or indirect, structural coupling, connection or attachment, or adaptation or capability for such a direct or indirect structural or operational coupling, connection or attachment, including integrally formed components and components which are coupled via or through another component or by the forming process. Indirect coupling may involve coupling through an intermediary member or adhesive, or abutting and otherwise resting against, whether frictionally or by separate means without any physical connection.

The term "engage" and various forms thereof, when used with reference to retention of a member, refer to the application of any forces that tend to hold two components together against inadvertent or undesired separating forces (e.g., such as may be introduced during use of either component). It is to be understood, however, that engagement does not in all cases require an interlocking connection that is maintained against every conceivable type or magnitude of separating force. Also, "engaging element" or "engaging member" refers to one or a plurality of coupled components, at least one of which is configured for slidably engaging a carrying handle or a portion thereof.

A more complete understanding of the components, processes, assemblies, and devices disclosed herein can be obtained by reference to the accompanying drawings. These figures (also referred to herein as "FIG.") are merely schematic representations (e.g., illustrations) based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1A-2B, show (FIG. 1A) an embodiment of the assembled baby seat shell with the handle in its extended position, with the handle in the retracted position illustrated in FIG. 1B. As illustrated, provided is portable baby seat 10 comprising: seat shell 300 having longitudinal axis (Xl, see e.g., FIG. 2B) configured to optionally accommodate and receive padded insert 200, seat shell 300 having shallow anterior end 301 and raised posterior end 303, and arcuate floor 302 rising from shallow anterior end 301 toward the raised posterior end 303 (see e.g., FIG. 1A, 2A), arcuate floor 302 defining longitudinal channel 310 configured to couple to arcuate handle 100. Optional padded insert 200 which may be in the form of a seat, can be configured to accommodate a baby (not shown), optional padded insert 200 can be configured in an embodiment to extend beyond shallow anterior end 301 of seat shell 300. In another embodiment, shallow anterior end 301 of seat shell 300 can be configured to accommodate all of optional padded insert 200. Also shown, is arcuate handle 100, having proximal end 101 and distal end 102 (see e.g., FIG. 3A) and longitudinal axis (see e.g., FIG. 2B, Xh), proximal end 101 of arcuate handle 100 can be configured to be positioned above portable baby seat's 10 center of gravity (not shown, will change based on baby dimensions) when carrying portable baby seat 10 and/or portable baby seat 10+ the baby (not shown).

As illustrated in FIG. 1A, seat shell 300 can further comprise seat shell stabilizing structure comprising member 308 (which, in another embodiment, can be an integral, monolithic portion of seat shell 300), configured to couple at one end to shallow anterior end 301 of seat shell 300 along longitudinal axis Xl of seat shell 300 and accommodate the portion of optional padded insert 200 extending beyond shallow anterior end 301 of seat shell 300. The stabilizing structure, which may be left in a vehicle in normal use, may additionally comprise a base member 309 which may rest on a vehicle seat in use and a strut 311, part of which is shown in FIG. 1, which may extend from the front of the vehicle seat to the vehicle floor. As also shown in FIG. 1A, seat shell stabilizing member 308 can further comprise additional handle 325 extending apically from the end of seat shell stabilizing member 308 opposite the one end of seat shell stabilizing member 308 coupled to seat shell 300.

Figure 2A:
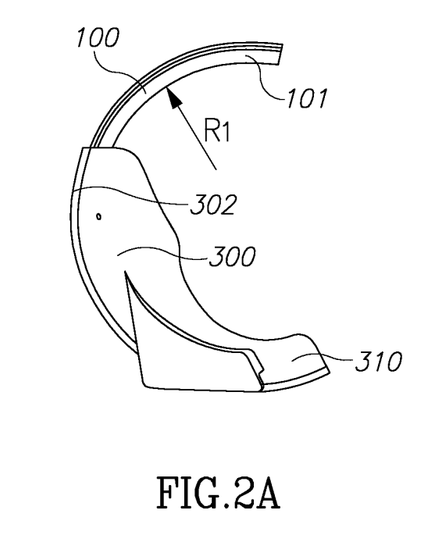
FIG. 2A shows side elevation view.
Figure 2B:
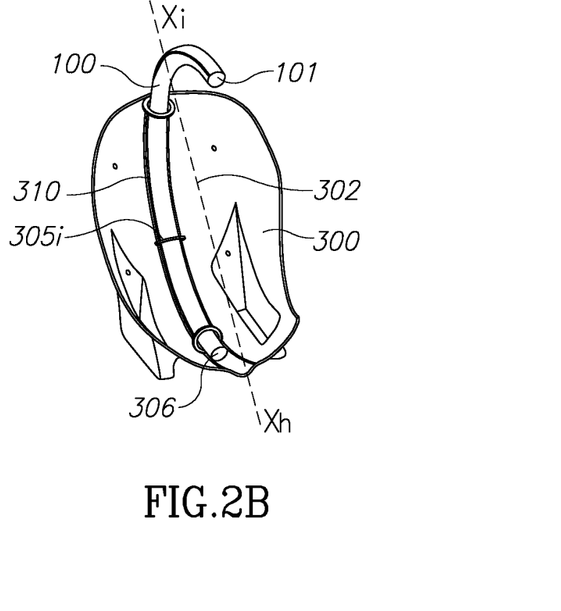
FIG. 2B shows a front perspective view, of a seat with the handle in its carrying position according to some embodiments of the invention.

Turning now to FIG. 2B, this illustrates that seat shell 300 can further comprise engagement means 305*i*, configured to slidably engage arcuate handle 100 or a portion thereof. Further, and as shown in FIG. 2A, radius R1 defined by arcuate handle 100 and/or longitudinal channel 310 defined in arcuate seat shell floor 302, can be between about 15 cm and about 70 cm., while radius R2 (not shown) of longitudinal channel 310 defined in arcuate seat shell floor 302 can be larger than radius R1 of arcuate carrying handle 100 (R2>R1), for example by between about 0.1 cm and about 5 cm. The flat base 306 of the arcuate handle can be seen past the engagement means in the longitudinal channel. The skilled artisan would readily recognize, that although the handle is described herein as arcuate, the arc defined by the handle need not have a single radius along its length, but rather that the radius may change, have inflection points or define angles without departing from the scope of the term, "arcuate". The handle therefore can be bent along its length.

According to some embodiments of the invention the handle, in both the extended and retracted positions, may extend from the raised posterior end of the shell towards the shallow anterior end. Part of the handle may be positioned below the centre of gravity when carrying the seat and the baby.

Turning now to FIGS. 3A-3B, showing (in FIG. 3B) that in the finite element simulation analysis, carrying handle 100 is supporting seat shell 300 and actively participates in distributing the loads exerted in seat shell 300.

Carrying handle 100 or portions thereof can be configured to have or define a circular cross section, or any other form of cross section that will allow the functionality described hereinabove. Any appropriate cross section, for example a polygon having three or more sides may be used. Moreover, the cross section may change along the longitudinal length of the arcuate handle. The handle can be made from any material capable of carrying the portable car seat in a way consistent with the desired properties of load reduction and impact deflection in crash situations.

Possible materials can be, for example, aluminum, resin (e.g., poly(ethylene), poly(carbonate)) and the like, as well as wood or other metals.

Figure 4A:
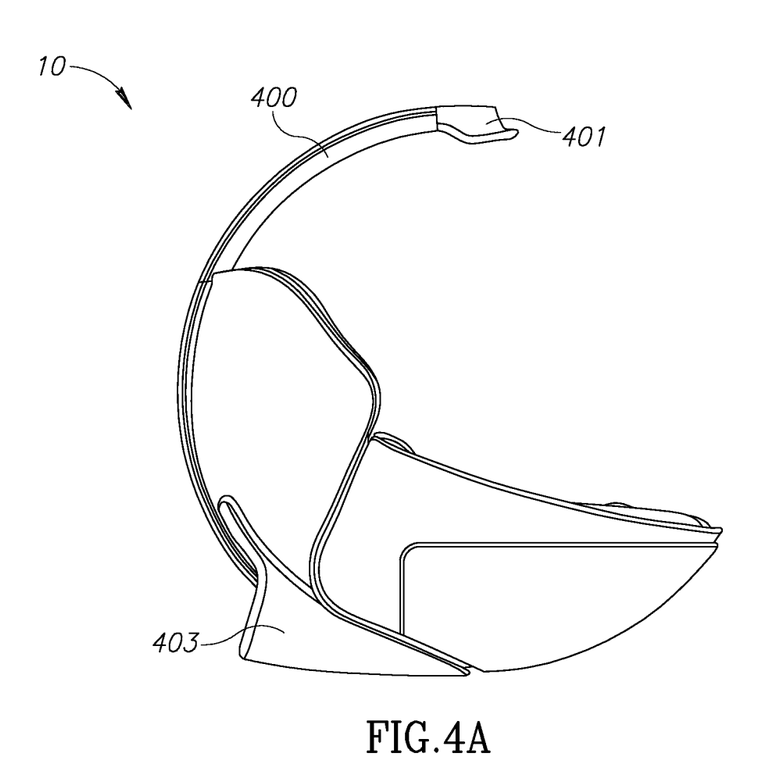
FIG. 4A shows a side view of a baby seat according to some embodiments of the invention with the handle in its extended position.
Figure 4B:
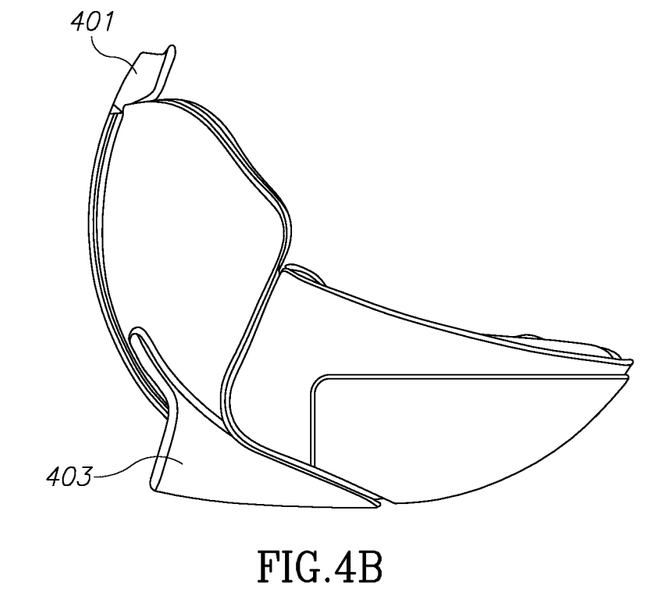
FIG. 4B shows the seat of FIG. 4A with the handle in the retracted position.

FIG. 4A is a side view of a baby seat 10 according to some embodiments of the invention, similar to the baby seat 10 of FIGS. 1A and 1B, without the stabilizing structure. FIG. 4A shows the assembled baby seat with the handle 400 in its extended position, and FIG. 4B shows the handle in its retracted position. The handle 400 may be so designed that in the extended position, the proximal end of the handle 401 is positioned over the center of gravity of the baby seat in FIG. 4A. In this position the distal end may be within the seat shell 403.

Figure 5A:
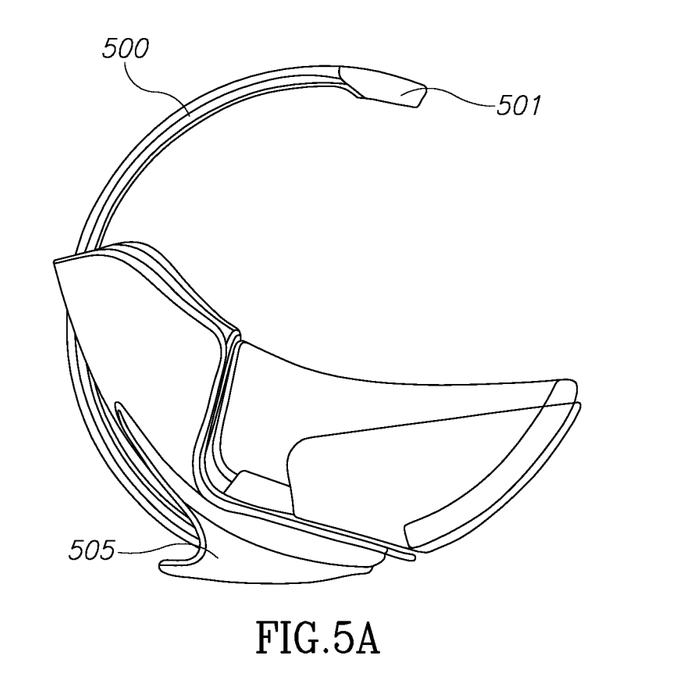
FIG. 5A shows a side view.
Figure 5B:
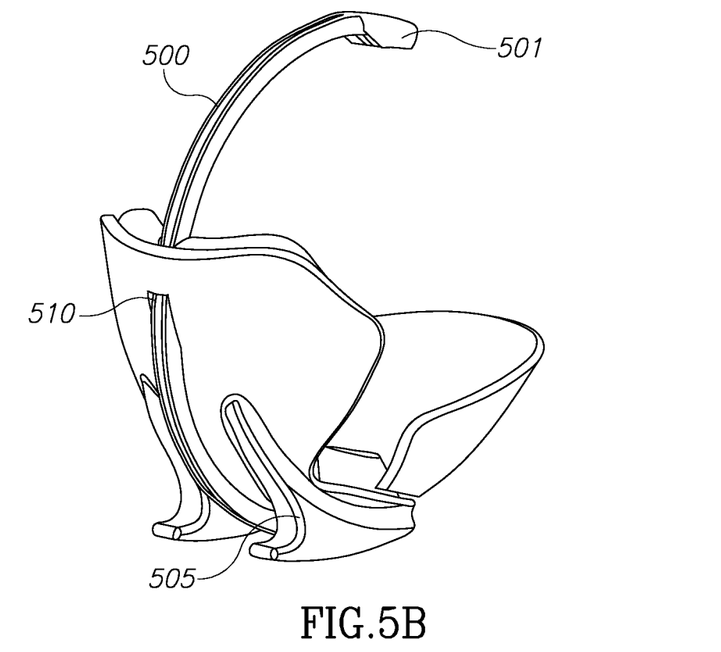
FIG. 5B shows a rear perspective view of an alternative baby seat according to some embodiments of the invention.

According to some embodiments of the invention the handle may be positioned adjacent to a surface of the seat shell. In the embodiment of FIGS. 2A and 2B the handle is adjacent to the interior surface of the shell. According to some embodiments of the invention the handle may be adjacent to the interior or the exterior of the shell. FIGS. 5A and 5B show a baby seat according to some embodiments of the invention in which, in contrast to the embodiments of FIGS. 2A and 2B, a longitudinal channel is not used to guide the retractable handle 500. In FIG. 5A, the proximal end of the handle 501 is shown positioned over the center of gravity of the baby seat. According to some embodiments of the invention, at least part of the handle, and optionally the whole of the handle, may be positioned on the outside of the shell. In the embodiment shown in FIGS. 5A and 5B, the arcuate handle is shown to extend outside of the shell 505. FIG. 5B illustrates how the arcuate handle may be guided through an opening 510 in the seat shell. The opening 510 may define part of a path along which the handle may be retractable. The path may extend along the interior and exterior surfaces of the shell.

Figure 6:
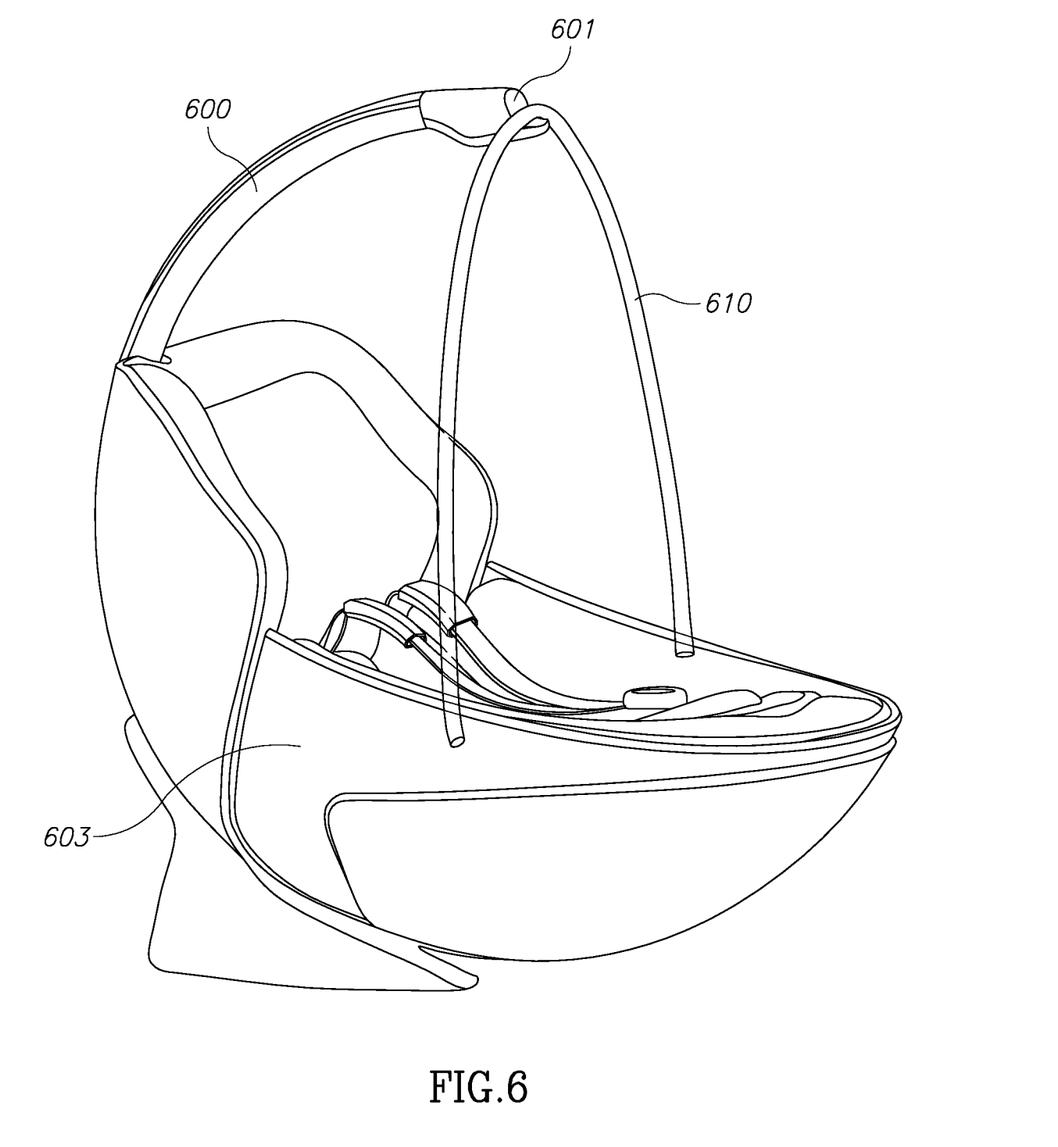
FIG. 6 shows a perspective view of a baby seat similar to the baby seat of FIGS. 5A and 5B, including a perpendicular support extending from the handle.

FIG. 6 shows a baby seat according to some embodiments of the invention additionally comprising a support 610 which may be used for example as a frame for a rain cover or sun shade. Thus according to some embodiments of the invention the support is not intended to support the weight of the seat or the baby. The support 610 shown in FIG. 6 is configured to extend laterally, e.g. perpendicularly to the arcuate handle 600. It may be attached to the arcuate handle, for example at or adjacent to the proximal end 601 of the arcuate handle 600, and the attachment may be detachable. The support may extend laterally from the proximal end 601 of the arcuate handle 600. Furthermore, this support 610 may be configured to be attached to the seat shell 603, for example on both sides as shown in FIG. 6.

In the figures the padded insert is shown as a shaped insert which may be designed to be accommodated in the shell. It should be noted that a padded insert according to some embodiments of the invention may simply comprise a blanket and may not be specially shaped.

While in the foregoing specification the portable baby seat having longitudinally oriented carrying handle has been described in relation to certain embodiments, and many details are set forth for purpose of illustration, it will be apparent to those skilled in the art that the disclosure of the portable baby seat having longitudinally oriented carrying handle is susceptible to additional embodiments and that certain of the details described in this specification and as are more fully delineated in the following claims can be varied considerably without departing from the basic principles of this invention.

The invention claimed is:

1. A portable baby seat comprising:
a seat shell having a longitudinal axis configured to accommodate and receive a padded insert, the seat shell having a shallow anterior end and a raised posterior end, and an arcuate floor rising from the shallow anterior end toward the raised posterior end; and
an arcuate handle, having a proximal end and a distal end and a longitudinal axis parallel to the longitudinal axis of the seat shell, the proximal end of the arcuate handle configured to be positioned above the portable baby seat's center of gravity when carrying the portable baby seat and/or the portable baby seat and the baby,
wherein the shell floor defines a longitudinal channel configured to couple to the arcuate handle.

2. The seat of claim 1, wherein the arcuate handle is coupled to the arcuate floor of the seat shell.

3. The seat of claim 2, wherein the arcuate handle is coupled to the back and the bottom of the seat shell.

4. The seat of claim 1, wherein the proximal end of the arcuate handle is configured to slidably transition between an extended carrying position and a stowed retracted position.

5. The seat of claim 1, wherein the seat is configured to have the baby facing forwards.

6. The seat of claim 5, wherein the seat is configured to be facing backwards.

7. The seat of claim 1, wherein the seat shell further comprises engagement means, configured to slidably engage the arcuate handle.

8. The seat of claim 1, wherein a radius defined by the arcuate handle and/or the longitudinal channel defined in the arcuate seat shell floor is between about 15 cm and about 70 cm.

9. The seat of claim 8, wherein the radius of the longitudinal channel defined in the seat shell floor is larger than the radius of the arcuate handle by between about 0.5 cm and about 5 cm.

10. The seat of claim 1, wherein holding the portable baby seat by the arcuate handle's proximal end is configured to reduce the load the seat shell floor experiences when lifted.

11. The seat of claim 1, wherein the arcuate handle is telescopic having a proximal sliding member telescopically nested within a distal sleeve member, the sliding member configured to extend from a stowed retracted position to an extended carrying position.

12. The seat of claim 1, further comprising a seat shell stabilizing member, configured to couple at one end to the shallow anterior end of the seat shell along the longitudinal axis of the seat shell.

13. The seat of claim 12, wherein the seat shell stabilizing member further comprises an additional handle extending apically from the end of the seat shell stabilizing member opposite the one end of the seat shell stabilizing member coupled to the seat shell.

14. The seat of claim 1, wherein the handle is manufactured of steel, aluminum, plastic, wood, a composite material, or a composition comprising one or more of the foregoing.

15. The seat of claim 14, wherein the composite material is a random carbon-fiber composite material, an aliphatic polyamide, a polyolefin, or a composite material comprising one or more of the foregoing.

16. The seat of claim 15, wherein the transverse cross section of the arcuate handle defines a polygon having three or more sides.

17. The seat of claim 1, further comprising a support configured to extend perpendicularly to the arcuate handle.

18. The seat of claim 17, wherein the support is configured to be attached to the proximal end of the arcuate handle.

19. The seat of claim 17, wherein the support is configured to be attached to one or both sides of the seat shell.

20. The seat of claim 1, wherein a radius of the longitudinal channel defined in the seat shell floor is larger than the radius of the arcuate handle by between about 0.1 cm and about 15 cm.

* * * * *